United States Patent [19]

Fujimoto

[11] Patent Number: 5,556,311
[45] Date of Patent: Sep. 17, 1996

[54] OUTBOARD MOTOR EXHAUST COOLING

[75] Inventor: Hiroaki Fujimoto, Hamamatsu, Japan

[73] Assignee: Sanshin Kogyo Kabushiki Kaisha, Hamamatsu, Japan

[21] Appl. No.: 505,098

[22] Filed: Jul. 21, 1995

[30] Foreign Application Priority Data

Jul. 28, 1994 [JP] Japan .................................. 6-194575

[51] Int. Cl.⁶ .................................................. B63H 21/32
[52] U.S. Cl. ............................................................ 440/89
[58] Field of Search ............................ 440/1, 2, 88, 89, 440/52; 60/295, 296, 299, 302, 314

[56] References Cited

U.S. PATENT DOCUMENTS

| | | | |
|---|---|---|---|
| 3,198,162 | 8/1965 | Larson | 440/89 |
| 3,431,882 | 3/1969 | Irgens | 440/89 |
| 3,754,399 | 8/1973 | Ono et al. . | |
| 4,353,208 | 10/1982 | Voker et al. . | |
| 4,735,046 | 4/1988 | Iwai . | |
| 4,772,236 | 9/1988 | Takahashi . | |
| 4,848,082 | 7/1989 | Takahashi et al. . | |
| 4,900,282 | 2/1990 | Takahashi et al. . | |
| 4,965,997 | 10/1990 | Suzuki et al. . | |
| 5,149,284 | 9/1992 | Kawai | 440/52 |
| 5,280,708 | 1/1994 | Sougawa et al. | 440/89 |
| 5,433,634 | 7/1995 | Nakayama et al. | 440/89 |

FOREIGN PATENT DOCUMENTS

| | | |
|---|---|---|
| 52-8932 | 3/1977 | Japan . |
| 57-150099 | 9/1982 | Japan . |
| 59-22000 | 6/1984 | Japan . |
| 59-41199 | 11/1984 | Japan . |
| 60-3039 | 1/1985 | Japan . |
| 62-28288 | 6/1987 | Japan . |
| 62-238192 | 10/1987 | Japan . |

Primary Examiner—Stephen Avila
Attorney, Agent, or Firm—Knobbe, Martens, Olson & Bear

[57] ABSTRACT

A catalytic exhaust system for an outboard motor wherein the catalyst is positioned in the drive shaft housing to remove this source of heat from the power head. However, the catalyst is contained within a sealed compartment in the drive shaft housing lower unit. In order to protect the catalyst from water, a trap section is positioned in the power head and this is water cooled by a source of water which has not passed through the engine for its cooling prior to delivery to the trap section. In addition, the guide plate that separates the power head from the drive shaft housing and through which the exhaust gases pass is also water cooled. An arrangement is incorporated for permitting replacement and servicing of the catalytic converter. Although both above the water and below the water exhaust gas discharges are employed, all gases flowing to the atmosphere must pass through the catalytic converter.

15 Claims, 10 Drawing Sheets

OUTBOARD MOTOR EXHAUST COOLING

BACKGROUND OF THE INVENTION

This invention relates to an outboard motor exhaust system and more particularly to an improved cooling arrangement for the exhaust system of outboard motors.

Because of the compact nature of outboard motors, the design of many of the components of the outboard motor is made quite difficult. A specific area where the size constraints present problems is in the design of the exhaust system for the outboard motor. In many vehicle applications, the exhaust system which transfers the exhaust gases from the engine to the atmosphere can have its length and shape varied within large parameters due to the nature of the vehicle that is powered. However, with outboard motors the exhaust system must be very compact and hence the silencing efficiency and tuning becomes quite a problem. For this reason, it is the normal practice to discharge the exhaust gases to the atmosphere, through an underwater exhaust gas discharge, under most running conditions. In this way, the exhaust gases are cooled and silenced by the body of water in which the watercraft is operating.

Also, it has been proposed to introduce the cooling water from the engine cooling jacket into the exhaust system so as to assist in the silencing and cooling of the exhaust gases. Cooling of the exhaust gases is important because this not only aids in the silencing, but it protects surrounding components from the heat of the exhaust. This heat transfer is a particular problem because of the compact nature of the outboard motor.

However, with increasing emphasis on protection of the environment, it is necessary or desirable to employ catalytic treatment systems for the exhaust gases. The catalyst can be utilized to remove harmful constituents from the exhaust gases or to transform them into less harmful products before they are discharged. Since the exhaust gases are also delivered to the atmosphere through the body of water in which the watercraft is operating, the control of water pollution also may dictate the desirability of employing catalysts.

However and is well known, the catalyst normally operates at a relatively high temperature to be effective. Also, the material of the catalyst is such that if it is cooled suddenly, the catalyst bed may fracture. Also, any water which may come in contact With the catalyst can pollute the catalyst by leaving deposits when the water evaporates. These problems are particularly acute in conjunction with operation in marine environments. The salt water can leave salt deposits on the catalyst that can foul it and reduce its capability of performing its intended functions.

In order to protect the catalyst from water damage, particularly when considering the fact that the exhaust gases have a discharge outlet that is below the water level, it is desirable to position the catalyst relatively high in the outboard motor. Such high locations will assist in protecting the catalyst. However, if the catalyst is positioned in close proximity to the power head, then the heat transfer problems become particularly acute. This is particularly true since a portion of the protective cowling of the power head is formed from a non-metallic material, such as a molded fiberglass reinforced resin or the like. These materials are quite susceptible to damage under high temperatures.

Bearing in mind these problems, it is, therefore, a principal object of this invention to provide an improved exhaust system for an outboard motor.

It is a further object of this invention to provide an improved catalytic exhaust system for such applications.

It is a still further object of this invention to provide an outboard motor exhaust system that employs a catalyst and wherein the catalyst if permitted to operate at a high temperature, but its temperature is insulated from surrounding components of the outboard motor which could be damaged by the heat.

It has been previously noted that in accordance with many prior art constructions, at least a portion of the engine cooling water is introduced to either a cooling jacket for the exhaust system or directly into the exhaust system to cool it. However, these arrangements are not satisfactory in conjunction with catalytic systems because by the time the water is delivered to the cooling jacket for the exhaust system, it will have been elevated in temperature and thus its cooling is not as effective. In addition, under many engine conditions, the amount of coolant that flows is relatively small and this small flow may not be adequate to cool the exhaust system cooling jacket.

In order to protect the catalyst from water, it has been proposed to employ a form of water trap between the exhaust gas discharge in the underwater location and the catalyst. If the catalyst is mounted in the power head, then the heat transfer becomes a problem. Therefore, it has been proposed to position the catalyst in the drive shaft housing and dispose the trap section in the power head with an exhaust guide being interposed between the catalyst and the trap section and also between the engine and the catalyst. In this way, the exhaust gases first flow through the exhaust guide to the catalyst in the drive shaft housing and then return back to a trap section in the power head through the exhaust guide for eventual discharge through the underwater exhaust gas discharge flowing again through the exhaust guide. With such arrangements it is extremely important that the exhaust guide be adequately cooled. As has been discussed above, the previously proposed cooling arrangements have not offered a total solution to this problem.

It is, therefore, a still further object of this invention to provide an improved arrangement for cooling the exhaust guide of an outboard motor exhaust system.

SUMMARY OF THE INVENTION

This invention is adapted to be embodied in an outboard motor that is comprised of a power head containing a water-cooled, internal combustion engine and a surrounding protective cowling. A drive shaft housing and lower unit depends from the power head and contains a propulsion device for the associated watercraft. Transmission means drive the propulsion device from the engine. An exhaust guide is interposed between the engine and the drive shaft housing and lower unit and has several exhaust gas openings. The engine has at least one exhaust port for the discharge of combustion products. An exhaust system delivers the exhaust gases from the exhaust port to the atmosphere through an underwater exhaust gas discharge under at least some running conditions. The exhaust system includes parts which communicate with the exhaust guide exhaust openings for exhaust gas flow through these openings. A coolant pump is provided for pumping water from the body of water in which the watercraft is operating. Conduit means deliver at least a portion of the water pumped by the water pump directly to a cooling jacket formed in the exhaust guide around its exhaust openings.

DETAILED DESCRIPTION OF THE PREFERRED EMBODIMENTS OF THE INVENTION

Figure 1:
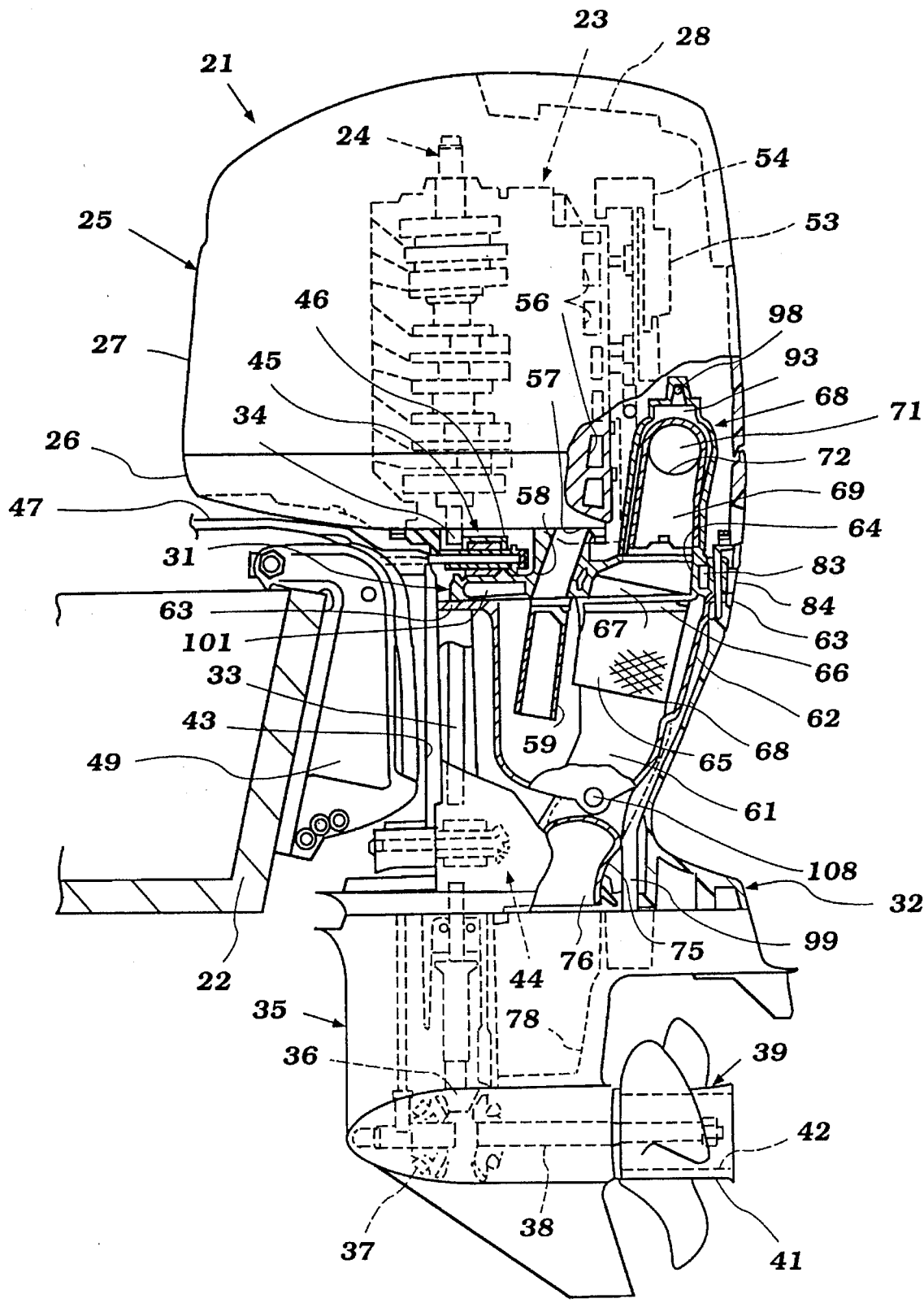
FIG. 1 is a side elevational view of and outboard motor constructed in accordance with an embodiment of the invention, shown attached to the transom of an associated watercraft, which is shown partially and in cross-section, and with a portion of the outboard motor broken away to more clearly show the exhaust system.

Referring now in detail to the drawings and initially primarily to FIGS. 1–4, an outboard motor constructed in accordance with an embodiment of the invention is identified generally by the reference numeral 21 and is shown as being attached to a transom 22 of an associated watercraft which is shown partially and in cross-section in FIG. 1. Since the invention deals primarily with the exhaust system for the outboard motor 21, many components of the outboard motor are shown only schematically and may not be described in full detail. Where that is the case, reference may be had to any conventional structure which can be utilized with the invention.

The outboard motor 21 is comprised of a power head that includes an internal combustion engine, indicated generally by the reference numeral 23 and shown, for the most part, either in phantom or in broken lines. It will be readily apparent to those skilled in the art how the invention may be utilized in conjunction with any of a wide variety of internal combustion engines. In the illustrated embodiment, the engine 23 is depicted as being of the V-6 crankcase compression, 2-cycle type. It will be readily apparent, however, to those skilled in the art, how the invention may be employed in conjunction with engines having other cylinder numbers and other configurations. Also the invention may be practiced with four cycle or rotary engines.

The engine 23 is mounted in the power head so that its crankshaft 24 rotates about a vertically disposed axis. This is to facilitate connection to a drive shaft, to be described later. The power head is completed by a protective cowling, indicated generally by the reference numeral 25, and which is comprised of a lower tray portion 26 and an upper main cowling portion 27. As is typical in this art, the tray portion 26 may be formed from a material such as an aluminum or aluminum alloy. The main cowling portion 27, on the other hand, is formed from a lighter weight, less rigid material such as a molded fiberglass reinforced resin or the like. The main cowling portion 27 is also provided with an insert piece that defines a protected atmospheric air inlet 28 through which air is drawn from the atmosphere for combustion in the engine 23 in a known manner.

Figure 2:
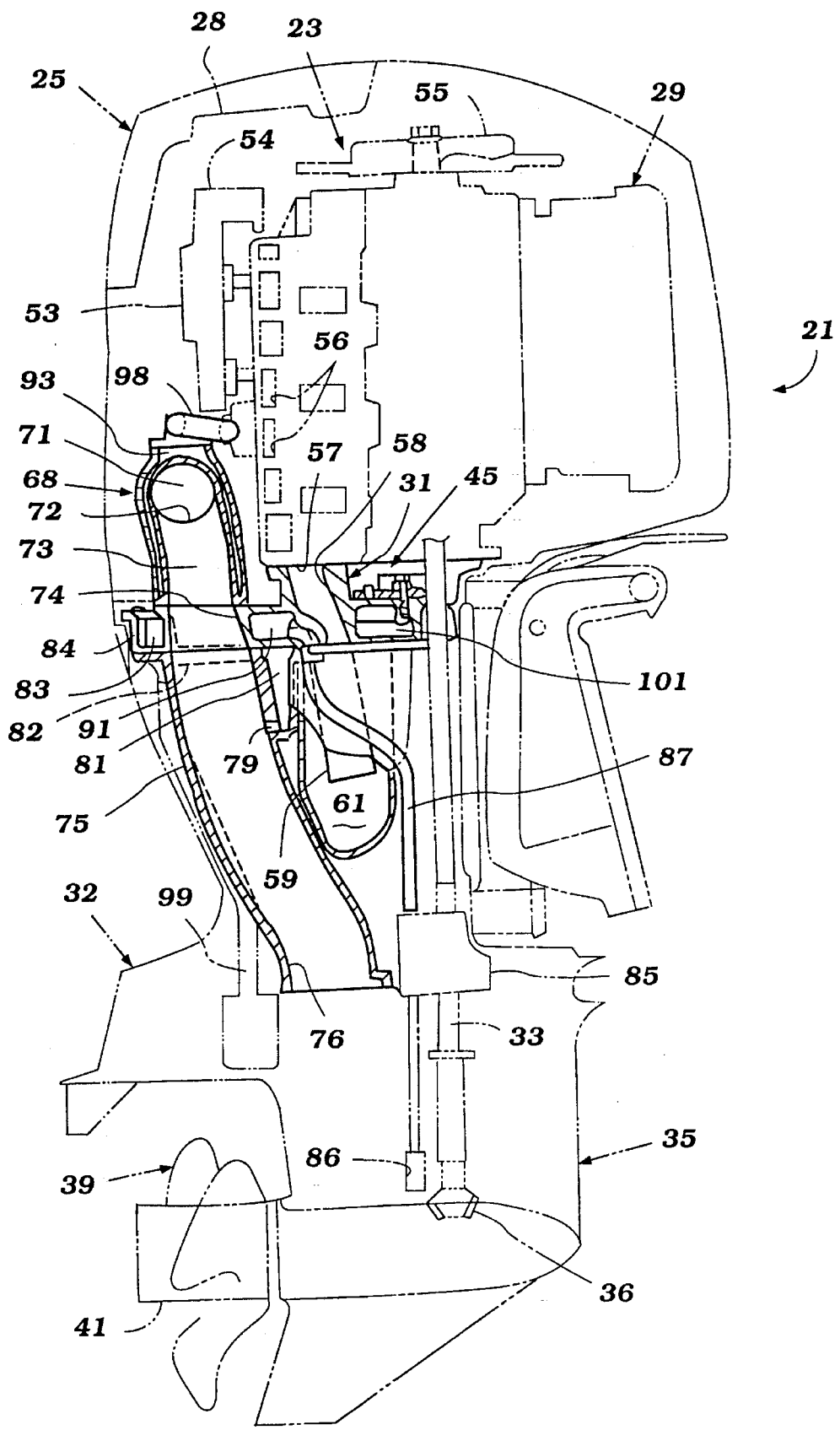
FIG. 2 is a side elevational view, looking from the direction opposite FIG. 1, and shows the major portions of the outboard motor in phantom with the exhaust system being shown partially in solid lines and in part in cross-section.
Figure 3:
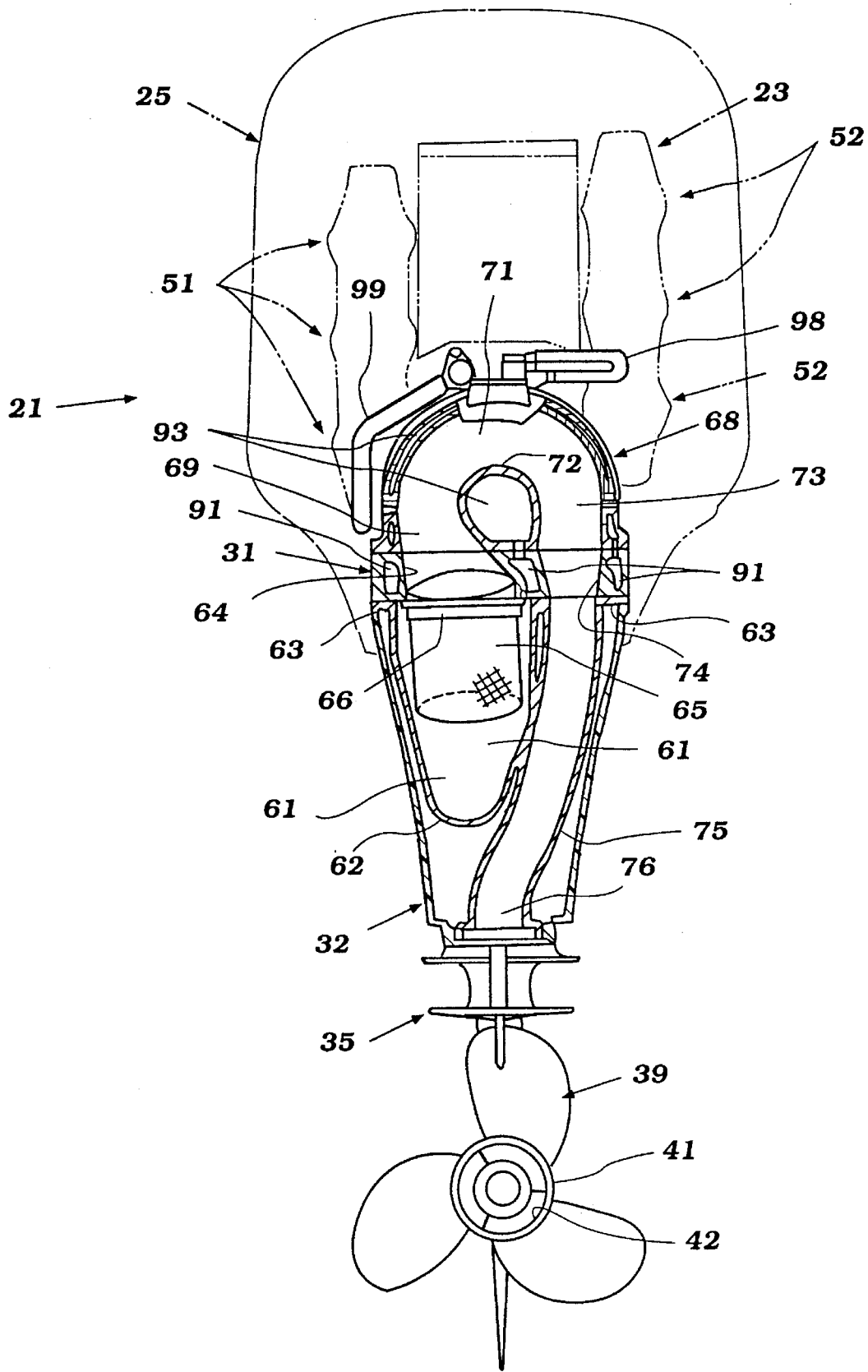
FIG. 3 is a rear elevational view of the outboard motor, again showing portions in phantom, portions of the exhaust system broken away and in cross-section, and other portions in solid lines.
Figure 4:
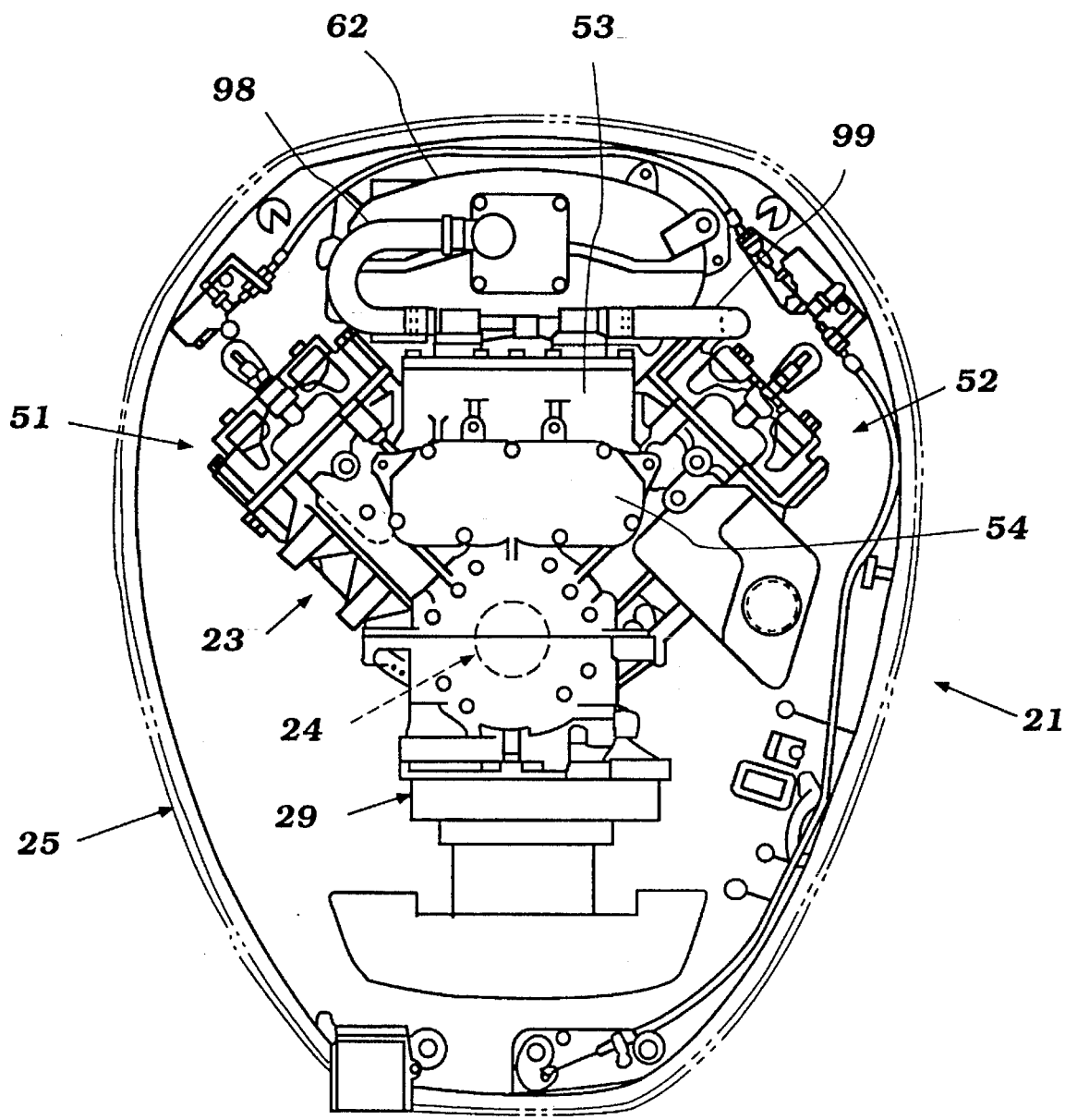
FIG. 4 is a top plan view of the power head with at least a portion of the protective cowling removed and other portions shown in phantom.

The induction system for the engine 23 is shown partially in broken lines in FIG. 2 and in solid lines in FIG. 3. This induction system is indicated generally by the reference numeral 29 and is disposed, in the illustrated embodiment, so that it extends forwardly toward the transom 22 and may, in fact, extend partially over it. This induction system 29 delivers at least an air charge to the crankcase chambers of the engine in which the crankshaft 24 rotates. Again, since this construction may be of any known type, a further description of it is not believed to be necessary.

The engine 23 is mounted on the upper side of a exhaust guide plate, indicated generally by the reference numeral 31, which exhaust guide plate extends into the upper end of a drive shaft housing, indicated generally by the reference numeral 32. A drive shaft 33 is rotatably journaled within the drive shaft housing 132 in a known manner and is coupled by means of a coupling 34 to the lower end of the crankshaft 24 so as to afford a driving relationship therebetween.

From the drive shaft housing 32, the drive shaft 33 depends into a lower unit 35. Within the lower unit 35, a bevel gear 36 is affixed to the drive shaft 33. This bevel gear 36 is enmeshed with the counter-rotating bevel gears of a forward-neutral-reverse transmission 37 of a known type. This transmission 37 is adapted to drive a propeller shaft 38 in selected forward or reverse directions, so driving a propeller 39 which forms the propulsion device for the watercraft having the transom 22. The propeller 39 is provided with an enlarged hub 41 having a through-the-hub exhaust gas discharge opening 42 formed therein which cooperates with an exhaust system to be described.

A steering shaft, not shown, is rotatably journaled within a swivel bracket 43 formed at the front of the drive shaft housing 32. This steering shaft is connected to the drive shaft housing 32 by means of a pair of lower elastic support bracket assemblies 44. An upper pair of elastic support bracket assemblies 45 connects the upper end of the steering shaft to a portion 46 of the guide plate 31. Hence, the power head 25, drive shaft housing 32 and lower unit 25 are pivotal relative to the swivel bracket 43 about the axis defined by this steering shaft. This affects steering of the outboard motor 21 in a well known manner. A tiller 27 is affixed to the upper end of the steering shaft so as to effect this steering movement.

A pivot pin 48 connects the swivel bracket 43 to a clamping bracket 49. This pivotal connection affords tilt and trim movement of the outboard motor 21 as is also well known in this art. The clamping bracket 49 carries a suitable mechanism by which it may be attached to the watercraft transom 22.

As may be seen, the engine 23 is comprised of a pair of angularly disposed cylinder banks 51 and 52, each of which forms three cylinder bores since, as has been noted, the engine 23 is of the V-6 type. These cylinder banks 51 and 52 diverge rearwardly and define a valley between them. Positioned within this valley are certain electrical components such as a capacitor discharge ignition circuit 53 and a voltage regulator rectifier circuit 54. These electrical components are disposed beneath the air inlet 28 so that they will be cooled. These cooperate with a magneto generator 55 that is formed in part by a flywheel assembly affixed to the upper end of the crankshaft 24. This ignition system fires the spark plugs for the engine 23 in a known manner.

The burnt charge from the cylinders of the engine is discharged through respective exhaust ports 56 formed in the cylinder banks 51 and 52 on the valley side of the engine. These exhaust ports 56 cooperate with respective exhaust manifolds formed internally within the cylinder block banks 51 and 52 and which terminate in downwardly facing exhaust discharge openings 57. These openings 57 cooperate with an exhaust system for discharging the exhaust gases to the atmosphere through, at times, the afore-noted underwater through-the-propeller-hub exhaust gas discharge opening 42. This exhaust system includes a pair of exhaust passages 58 formed in side-by-side relationship in the exhaust guide 31 and which are aligned with the exhaust manifold outlet openings 57.

Referring now additionally to FIGS. 6–9, a pair of exhaust pipes 59 are affixed to the underside of the exhaust guide plate 31 and receive the exhaust gases transmitted through the exhaust guide plate openings 58. These exhaust pipes 59 terminate in an expansion chamber, indicated generally by the reference numeral 61 and which is formed by means of a generally bag-shaped enclosure member 62 having a flange 63 that is affixed to the underside of the guide plate 31 by means of a plurality of fasteners.

The exhaust gases entering the expansion chamber 61 from the exhaust pipes 59 will expand and this expansion causes some silencing of the exhaust gases and also some cooling of them. The exhaust gases then flow upwardly to reenter the power head within the protective cowling 25 through a further exhaust passage 64 formed in the guide plate 31.

However, before passing through the opening 64, the exhaust gases pass through a catalyst bed 65 which is mounted by means of a flange assembly 66 on the underside of the guide plate 31. The catalyst bed 65 may be of an appropriate material to treat the exhaust gases. Preferably, the bed 65 is of the open type so that the exhaust gases can flow through it but will contact the surface of the catalyst material for its treatment.

Because of the fact that the catalyst bed 65 is mounted by the flange assembly 66, it may be easily removed for servicing and replacement by removing the exhaust guide plate 31 from the assembly and then replacing the catalyst back.

It should also be seen that the catalyst bed 65 has a portion 67 that extends upwardly beyond the flange 66 and into the guide opening 64. This permits a compact assembly. In addition, the member 62 that forms the expansion chamber 61 is provided with an offset shoulder 68 (see FIG. 1) so as to provide clearance for the bed 66 but still maintaining an air gap between the outer periphery of the member 62 and the inner periphery of the drive shaft housing 32.

Figure 7:
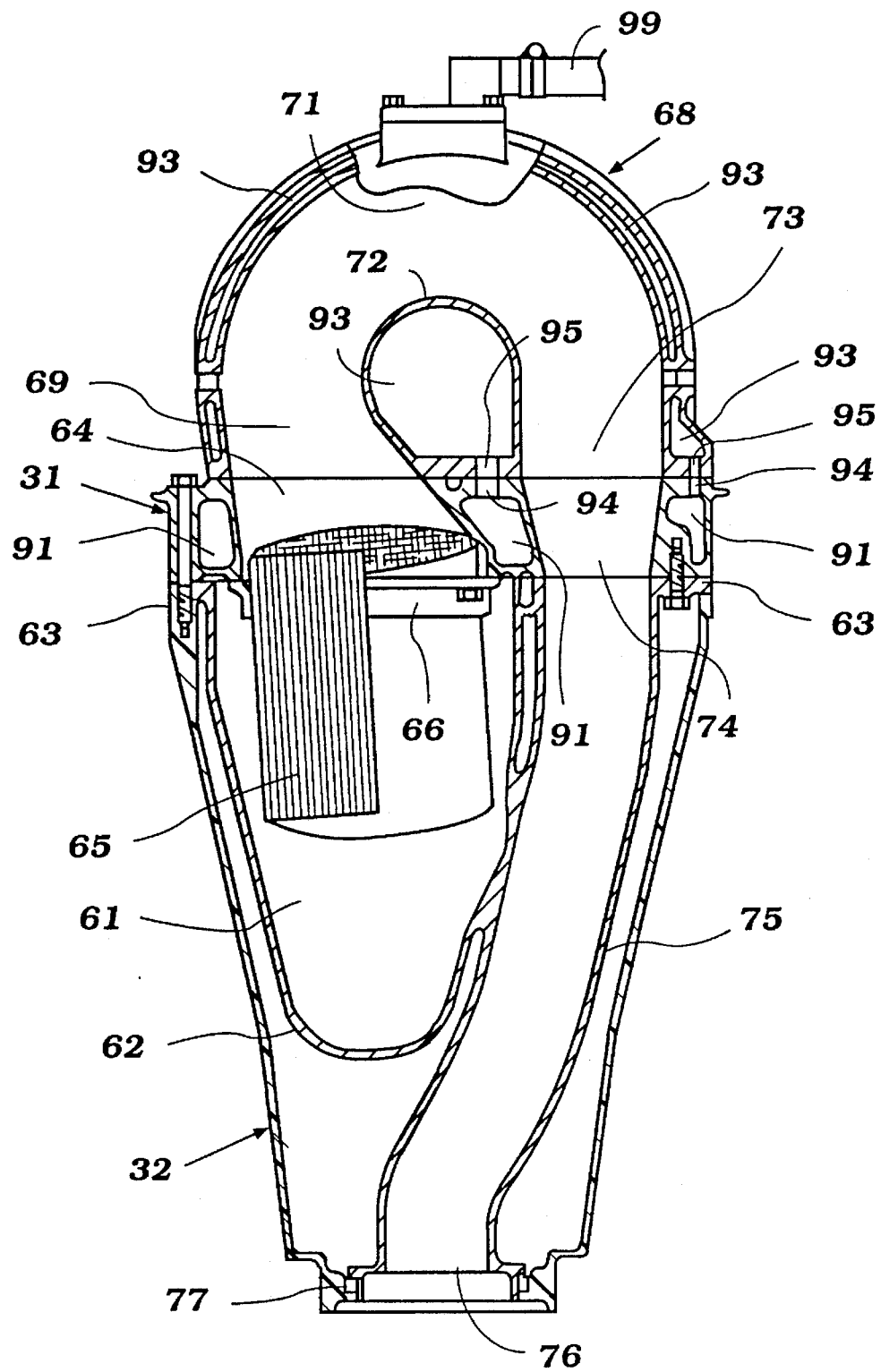
FIG. 7 is an enlarged cross-sectional view showing the portions of the exhaust components shown in cross-section in FIG. 3.

A trap section, indicated generally by the reference numeral 68 and having a construction as best seen FIGS. 1, 2 and 7 is affixed to the upper side of the exhaust guide plate 31 and within the protective cowling 25. This trap section 68 is disposed at the rear of the power head and includes a first vertically extending inlet section 69. The inlet section 69 extends upwardly from the opening 64 in the exhaust guide plate to receive the exhaust gases that have passed through the catalyst bed 65. At the upper end, the section 69 merges into a generally horizontally extending section 71 which is positioned, as shown in FIGS. 1 an 2 at a vertical distance above the lower most exhaust port 56 of the engine. As will become apparent, this configuration provides a trap inasmuch as a lower surface 72 of the portion 71 is disposed at a relatively high height. Thus, water which may tend to try to enter the engine through the exhaust system must flow higher than this distance before it can reach the catalyst bed 65 and/or the lower ends of the exhaust pipes 59.

A further downwardly extending section 73 extends from the termination of the horizontal portion 71 and is aligned with a further exhaust opening 74 formed in the exhaust guide plate 31. It should be noted that the trap section 68 extends generally in a direction transversely of the longitudinal axis of the outboard motor 21. This is generally parallel to the trim axis 48 and, thus, provides further assurances that water may not be driven upwardly through the exhaust system during sudden slowdowns in watercraft movement.

Formed integrally with the member 61 is an exhaust outlet pipe section 75 which extends downwardly on one side of the expansion chamber 61 and which terminates in an outlet opening 76. The outlet opening 76 is surrounded by an elastic seal 78 to provide a seal around the lower end of the drive shaft housing 32. This outlet end 77 communicates with an exhaust cavity 78 (FIG. 1) formed in the lower unit 35 and which communicates with the through the hub exhaust discharge assembly 42 in a known manner.

From the foregoing description, it should be apparent that, although the exhaust gases are discharged through a below the water exhaust gas discharge specifically the discharge 42 in the hub 41 of the propeller 39, before any water can reach the catalyst bed 65, it must travel vertically upwardly to the lower surface 72 of the trap section 68. This is a relatively high height and this provides good assurance that water cannot impinge upon the catalyst bed 65. Furthermore, this construction precludes the likelihood that water will be able to enter the engine through the exhaust port 56. It should be remembered that, the lower trap surface 72 is above the lower most exhaust port and, thus, this insurance is provided.

It should be readily apparent that, when the watercraft having the transom 22 is traveling through the body of water in which it is operating at a low speed or when idling therein, the through the hub propeller discharge opening 42 will be quite deeply submerged. At this same time, the exhaust pressure generated in the exhaust system of the engine 23 will be relatively low. Therefore, the back pressure will be such that the exhaust gases cannot be freely discharged through the path described.

To permit good engine performance under these conditions, there is provided an above the water exhaust gas discharge through which the exhaust gases may pass. As will become apparent, however, this discharge is disposed so that it is taken at a point downstream of the catalyst bed 65 so as to ensure that the exhaust gases will be treated by the catalyst bed 65 even when discharged through this outlet.

To this end, the exhaust discharge pipe 75 is formed with a restricted idle exhaust passage 79 (FIG. 2) which opens into a small expansion chamber 81 formed to the front of the exhaust discharge pipe section 75 and between it and the expansion chamber 61. The size of the opening 79 is sufficient small so that no significant volume of exhaust gases may flow through the opening 79 when running at high engine speeds.

The expansion chamber 81 opens to the under side of the exhaust guide plate 31. There is provided a relatively narrow exhaust gas channel 82 that extends from the expansion chamber 81 to a further expansion chamber 83 formed to the rear of the exhaust guide plate 31 and on the rear side of the exhaust discharge pipe 75. This expansion chamber 83 cooperates with a restricted above the water exhaust gas discharge opening 84 formed in the rear of the spacer plate.

As should be readily apparent, the opening 84 is above the water under all running conditions and, in fact, is at a height slightly higher than that of the transom 22. Hence, the exhaust gases under idle can be discharged through this opening 84. As noted, however, these exhaust gases will have been treated by passing through the catalyst bed 65. They will also have been silenced by the expansion first in the expansion chamber 61, then in the idle discharge expansion chambers 81 and 83.

It should be readily apparent that the positioning of the trap device 68 in the power head and, specifically within the protective cowling 25, gives rise to an area of high heat within this protective cowling. This heat is in juxtaposition to the cowling member 27 which, as has been noted, is formed from a nonmetallic material. Hence, it is desirable to ensure that heat is dissipated from this area. A system for cooling the trap device 68 and also the exhaust guide 31 is provided and this includes part of the normal cooling system for the engine 23. In this regard, the engine 23 is water cooled. It is provided with suitable cooling jackets and any type of known internal circulatory system.

As is typical of outboard motor practice, a water pump, indicated generally by the reference numeral 85 and shown in FIG. 2 is provided in the area where the drive shaft 32 is connected to the lower unit 35. This water pump 85 is driven off of the drive shaft 33 in a well known manner. In accordance with a feature of the invention, the capacity of the water pump 85 is greater than that required for merely engine cooling. This is because some of the cooling water is bled off for cooling portions of the exhaust system, as will become apparent.

The water pump 85 draws water from the body of water in which the watercraft is operating through an underwater inlet 86 that is formed in the lower unit 35 at a point which will be below the water under all normal running conditions. This water is then discharged through a vertically upwardly extending discharge conduit 87 toward the exhaust guide plate 31. The upper end of the conduit 87 discharges into a passageway 88 formed in the lower end of the exhaust guide 31. This passageway 88 is intersected by a cross-passage 89 which delivers water to the cooling jacket of the engine 23 in a known manner. However, a large portion of the water pumped by the water pump 85 is delivered to an exhaust guide cooling jacket 91 through a supplied port 92. The exhaust guide cooling jacket 91 encircles not only the exhaust passages 58 to which the exhaust pipes 59 are affixed, but also the passages 64 that supply the exhaust gases to the trap section 68 downstream and around the catalyst bed 65. In addition the water jack 91 extends around the passage 74 of the guide plate that receive the exhaust gases from the trap section 73 and deliver them to the exhaust outlet pipe 75. Hence, there will be substantial cooling water to cool the exhaust guide plate 31 and none of this water will have been previously passed through the cooling jacket of the engine 23 unlike prior art types of constructions.

The trap device 68 is also cooled and to this end it is provided with a double wall construction so as to define a cooling jacket 93 around the bulk the trap section including both the vertically extending leg portions 69 and 73 and the horizontally extending portion 71. This cooling jacket 93 is provided with coolant from the exhaust guide cooling jacket 91 through a plurality of passages 94 formed in the exhaust guide 31 and matching passages 95 formed in the underside of a flange 96 of the trap section 68.

Figure 9:
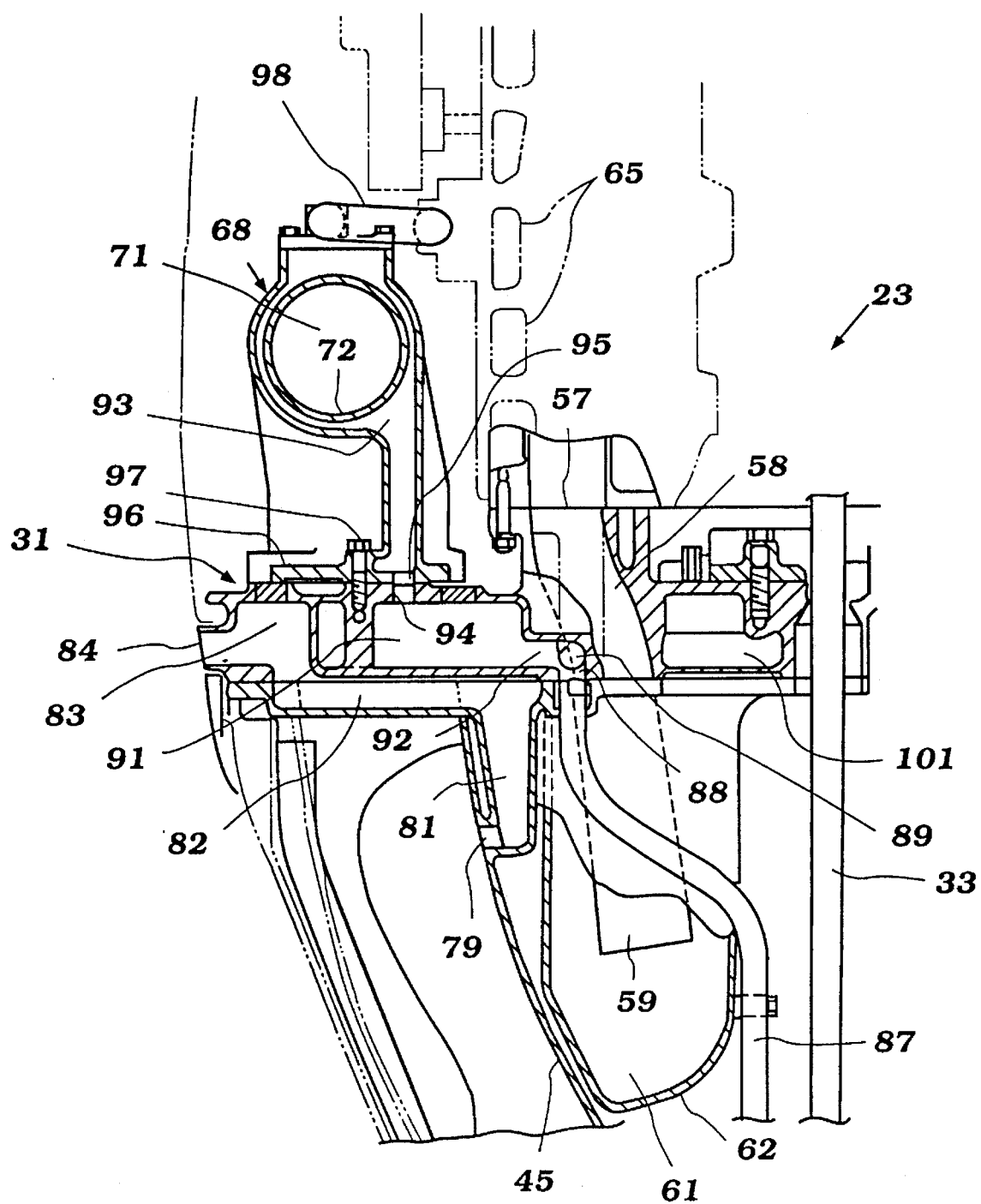
FIG. 9 is an enlarged side elevational view, with portions broken away, and shows the relationship of the exhaust manifold, trap section and cooling arrangements therefor.

This flange 96 is affixed to the exhaust guide 31 by fasteners 97, one of which appears in FIG. 9. After the coolant has circulated through the cooling jacket 91 of the exhaust guide 31 and the jacket 95 of the trap section 68, it is delivered by a filling 98 to the cooling jacket of the engine on either the up or downstream sides of this cooling jacket for mixing with the remaining cooling water in the engine before return to the body of water in which the watercraft is operating through a drain line 99 (FIG. 1) that has a discharge in the lower unit 35 at or below the water level.

Figure 5:
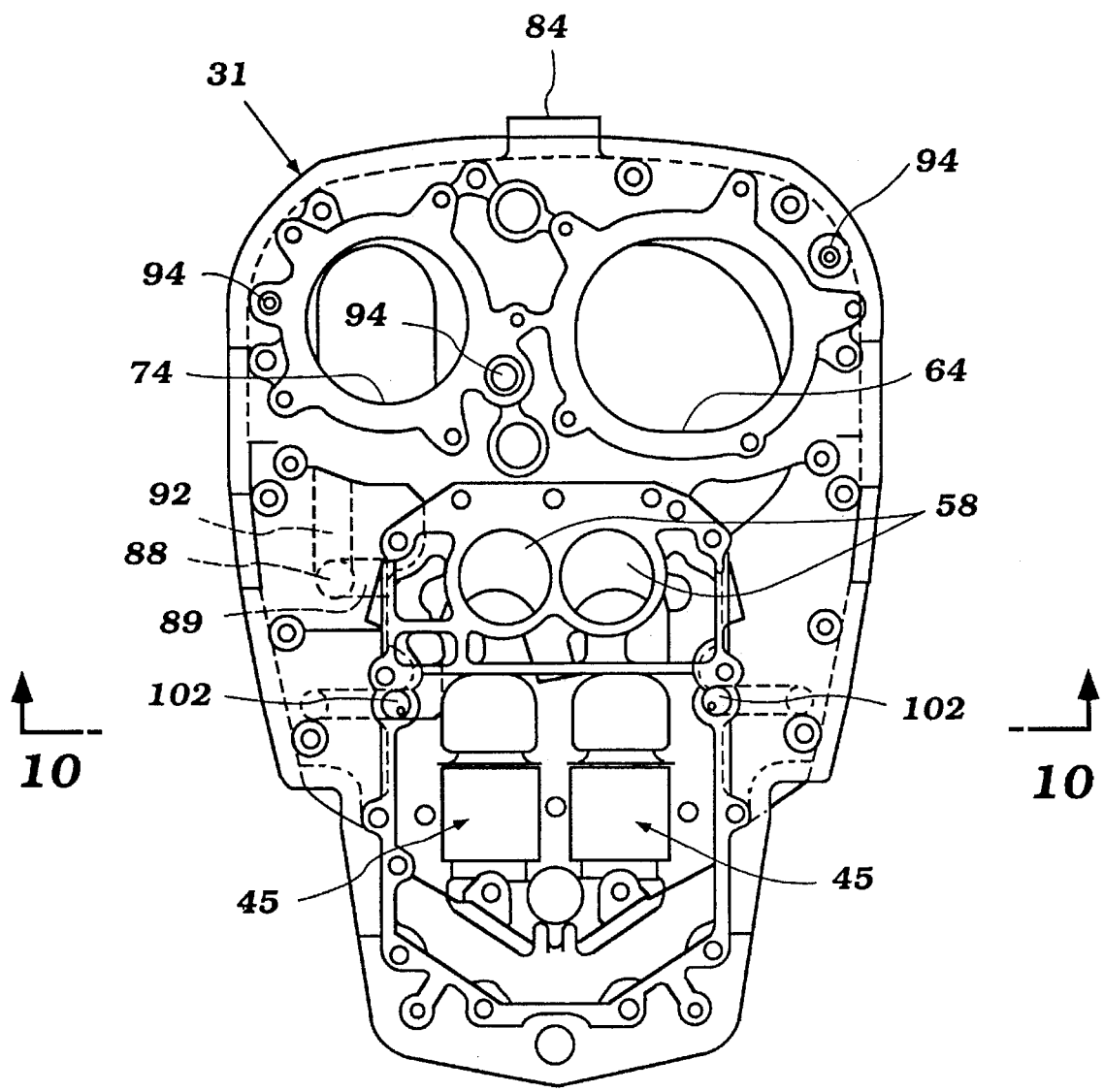
FIG. 5 is a top plan view of the upper side of the exhaust guide plate assembly.
Figure 6:
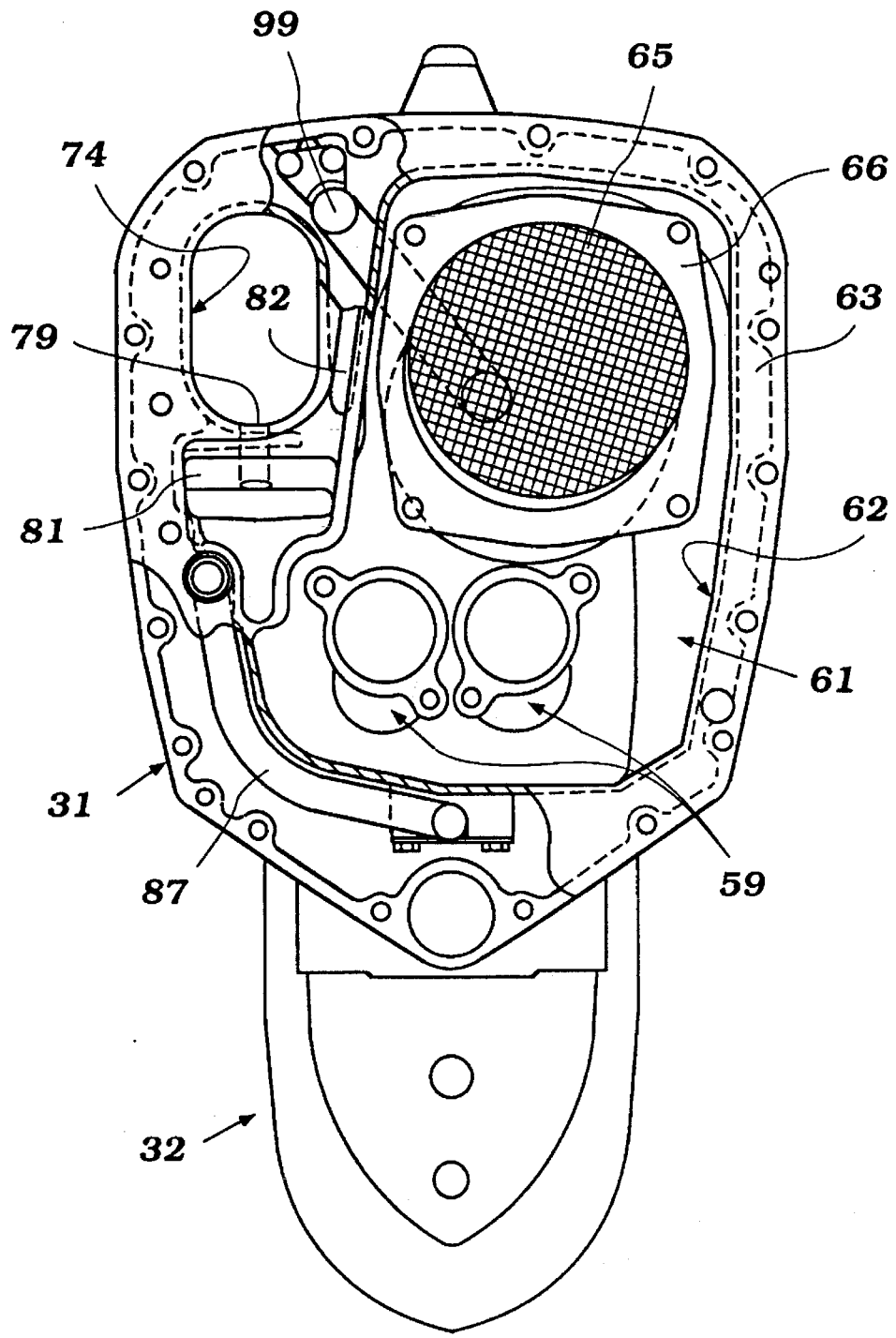
FIG. 6 is a view taken along a plane extending parallel to the lower surface of the exhaust guide plate and depicts the upper interior portion of the drive shaft housing.
Figure 10:
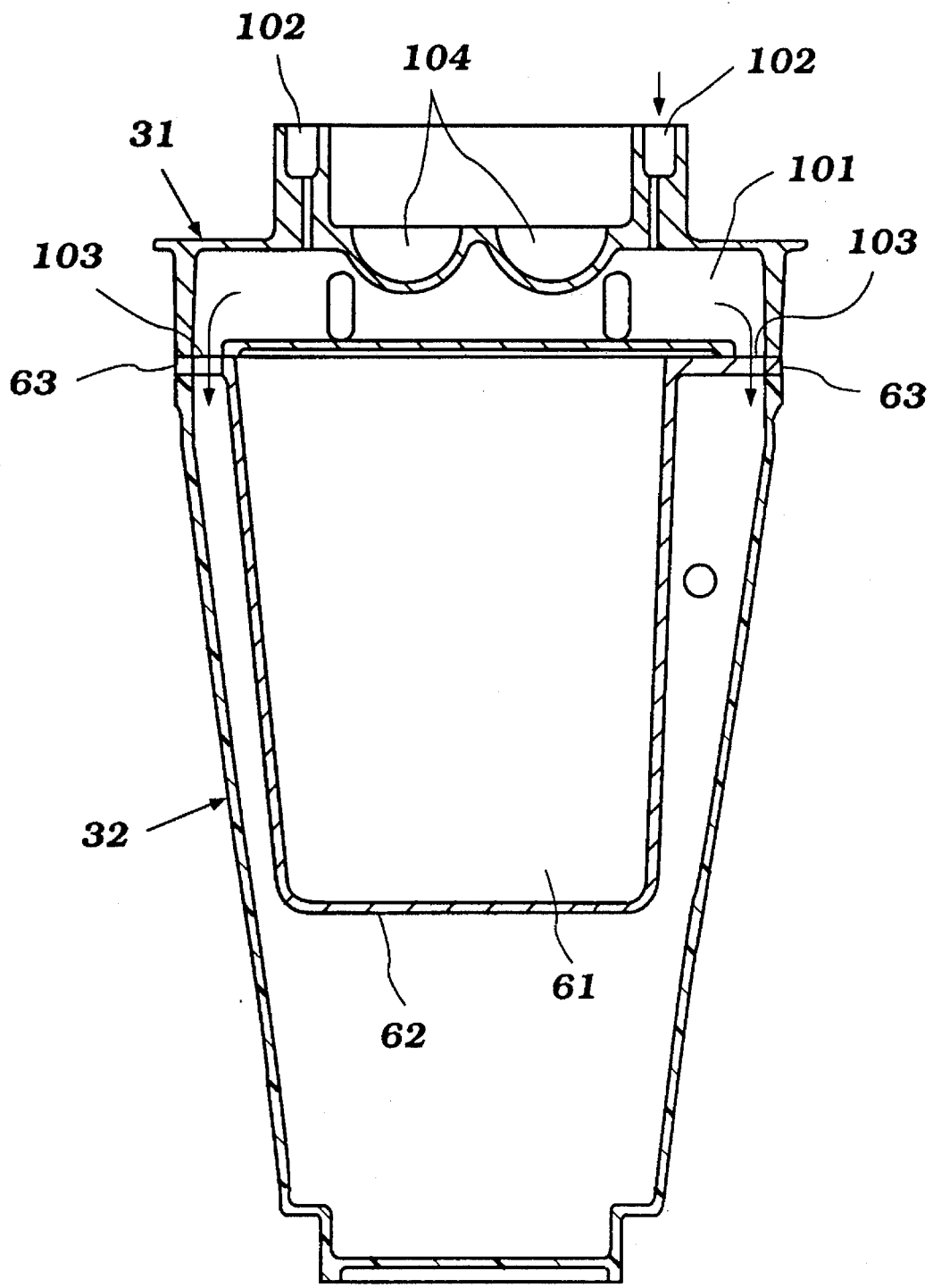
FIG. 10 is a cross sectional view taken along the line 10—10 of FIG. 5.

It should further be noted that the exhaust guide has a further cooling jacket 101 that extends beneath the upper resilient support members 45. Some of the cooling water from the engine cooling jackets may be discharged back into the cooling jacket by drain passages 102 as shown in FIGS. 5 and 10. This water then can be drained into the drive shaft housing 32 through drain openings 103 or in any other manner. The elastic members 45 may be cooled with this hotter water because they do not require the same degree of cooling as the exhaust system. Hence, they will be isolated and cooled from the heat of the exhaust gases. This is particularly important again since these components are subject to deterioration if they become too highly heated. As may be seen in FIG. 10, recesses 104 in the guide plate 31 above the cooling jacket 101 receive these elastic supports.

Figure 8:
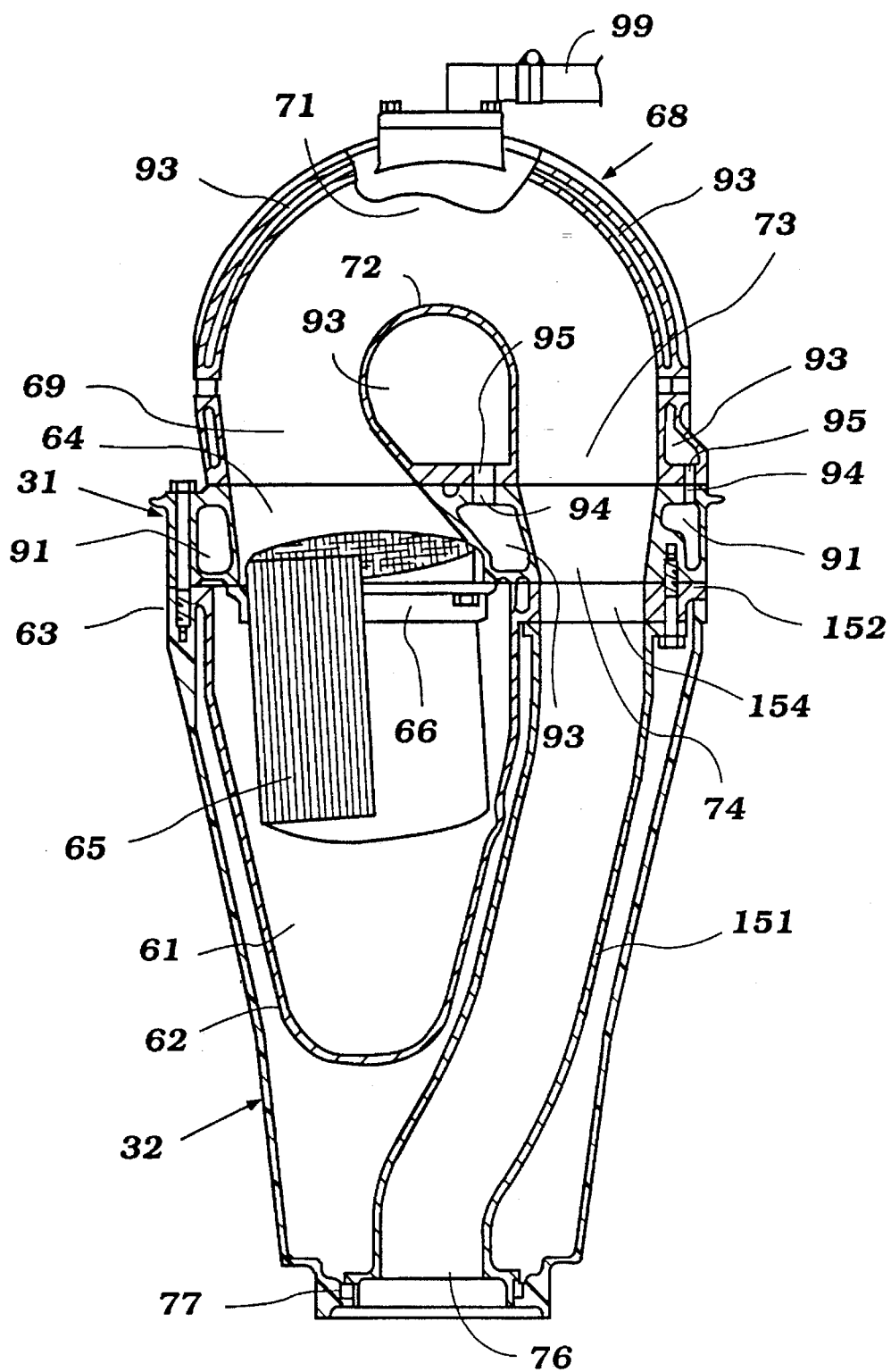
FIG. 8 is a cross-sectional view, in part similar to FIG. 7, and shows another embodiment of the invention.

In the embodiment as thus far described, the expansion chamber 61 and its forming number 62 as well as the exhaust discharge pipe 75 have been formed from a common single piece construction. It should be understood, however, that it is possible to split these two elements into a two-piece construction and such an arrangement is shown in FIG. 8. Since the only difference between this embodiment and that previously described is the two-piece construction, only a single figure is believed to be necessary to enable those skilled in the art to understand this embodiment.

In this embodiment, a separate exhaust discharge pipe 151 has a flange section 152 that is connected by threaded fasteners 153 to the remainder of the body 62 forming the expansion chamber 61. Because this is the only difference from the embodiment already described, it is believed that those skilled in the art will readily understand how the construction is formed without having additional description.

Therefore, it should be readily apparent that the described embodiments well fulfill the object of the invention. However, various changes and modifications may be made without imparting from the spirit and scope of the invention, as defined by the appended claims.

I claim:

1. An outboard motor comprised of the power head containing an internal combustion engine and a surrounding protective cowling, a drive shaft housing and lower unit depending from said power head and containing a propulsion device for an associated water craft, transmission means for driving said propulsion device from said engine, an exhaust guide interposed between said engine and said drive shaft housing and lower unit, a plurality of exhaust openings in said exhaust guide, said engine having at least one exhaust port for discharging combustion products therefrom, an exhaust system for discharging exhaust gases from said exhaust port to the atmosphere through a body of water which the associated water craft is operating under at least some running conditions, said exhaust system including parts which communicate with said exhaust guide exhaust openings for flow therethrough, a cooling pump for pumping water from the body of water in which said watercraft is operating, and conduit means for delivering at least a portion of the water pumped by said water pump directly to a cooling jacket formed in said exhaust guide around said exhaust openings.

2. An outboard motor as set forth in claim 1, wherein one of the exhaust guide openings is interposed between the exhaust port and a portion of the exhaust system extending into the drive shaft housing and lower unit for delivering exhaust gases from said engine into an expansion chamber formed in said drive shaft housing and lower unit, said exhaust system including a trap formed in said power head and having an inlet in registry with another exhaust opening in said exhaust guide and an outlet communicating with a further exhaust opening in said exhaust guide, said further opening communicating with an exhaust discharge pipe of said exhaust system which discharges the exhaust gases to the atmosphere.

3. An outboard motor as set forth in claim 2, further including a catalyst positioned within the expansion chamber and communicating with one of the exhaust guide exhaust openings.

4. An outboard motor as set forth in claim 3, wherein the catalyst communicates with the exhaust guide exhaust opening that delivers the exhaust gases to the inlet of the trap.

5. An outboard motor as set forth in claim 4, when the trap comprises a pair of vertically extending sections interconnected by a horizontally extending section, said horizontally extending section being positioned vertically above said exhaust port.

6. An outboard motor as set forth in claim 5, further including a trap cooling jacket encircling the trap device.

7. An outboard motor as set forth in claim 6, wherein the horizontally extending section of the trap extends transversely to a longitudinal center plane of the outboard motor.

8. An outboard motor as set forth in claim 7, wherein the trap is disposed to the rear of the engine.

9. An outboard motor as set forth in claim 8, when the outboard motor is supported for tilt and trim movement about a horizontally disposed tilt axis and the horizontal portion of the trap extends parallel to the tilt axis.

10. An outboard motor as set forth in claim 6, wherein the trap cooling jacket receives water from the exhaust guide cooling jacket.

11. An outboard motor as set forth in claim 10, wherein the engine is provided with a cooling jacket and the water from the trap cooling jacket is delivered to the engine cooling jacket.

12. An outboard motor as set forth in claim 1, wherein the drive shaft housing lower unit is connected to a steering shaft by means of at least one elastic element, said elastic element being affixed to the exhaust guide, the exhaust guide having a cooling jacket disposed in proximity to said elastic element and receiving water pumped by the cooling pump.

13. An outboard motor as set forth in claim 12, wherein the exhaust system further includes a trap disposed above the exhaust guide and having an inlet opening communicating with one of the exhaust guide exhaust openings and an outlet opening cooperating with another of the exhaust guide exhaust openings and a trap cooling jacket encircling said trap and receiving water pumped by the coolant pump.

14. An outboard motor as set forth in claim 13, wherein the trap cooling jacket receives water from the exhaust guide cooling jackets that encircle the exhaust openings.

15. An outboard motor as set forth in claim 14, wherein the engine is provided with a cooling jacket and the water from the trap cooling jacket is delivered to the engine cooling jacket.

* * * * *